(12) United States Patent
Schaffeld

(10) Patent No.: US 7,913,730 B2
(45) Date of Patent: Mar. 29, 2011

(54) MODULAR RAISED WALL PANELING SYSTEM AND METHOD OF MANUFACTURE

(75) Inventor: Gary Schaffeld, Cincinnati, OH (US)

(73) Assignee: Advantage Architectural Products, Ltd., Cincinnati, OH (US)

( * ) Notice: Subject to any disclaimer, the term of this patent is extended or adjusted under 35 U.S.C. 154(b) by 462 days.

(21) Appl. No.: 11/657,350

(22) Filed: Jan. 24, 2007

(65) Prior Publication Data

US 2008/0060318 A1    Mar. 13, 2008

Related U.S. Application Data

(62) Division of application No. 10/389,497, filed on Mar. 14, 2003, now Pat. No. 7,185,469.

(51) Int. Cl.
B27F 1/00 (2006.01)

(52) U.S. Cl. ......... 144/354; 144/360; 144/367; 144/368

(58) Field of Classification Search .................. 144/354, 144/350, 371, 367, 368, 360; 52/455, 457, 52/584.1, 592.1, 656.2, 656.9
See application file for complete search history.

(56) References Cited

U.S. PATENT DOCUMENTS

| | | | | |
|---|---|---|---|---|
| 714,987 A * | 12/1902 | Wolfe | ............................. | 52/578 |
| 1,927,557 A * | 9/1933 | Rosenblum et al. | .......... | 52/311.2 |
| 2,334,113 A * | 11/1943 | Malarkey | ........................ | 52/455 |
| 2,825,099 A * | 3/1958 | Simmons | ........................ | 52/455 |
| 3,308,592 A * | 3/1967 | Miller, Jr. | ........................ | 52/455 |
| 3,310,919 A * | 3/1967 | Bue et al. | .................... | 52/127.11 |
| 3,579,941 A * | 5/1971 | Tibbals | ............................ | 52/384 |
| 3,777,431 A * | 12/1973 | Bowman | ........................ | 52/562 |
| 4,122,633 A * | 10/1978 | Holdiman | ........................ | 49/501 |
| 4,265,068 A * | 5/1981 | Pomroy | ........................ | 52/456 |
| 4,299,067 A * | 11/1981 | Bertschi | ........................ | 52/127.12 |
| 4,724,638 A * | 2/1988 | Bezborodko | .............. | 52/506.05 |
| 4,736,559 A * | 4/1988 | Young | ............................. | 52/313 |
| 4,807,416 A * | 2/1989 | Parasin | ........................ | 52/592.4 |
| 4,844,135 A * | 7/1989 | Witt | ............................. | 144/371 |
| 5,025,841 A * | 6/1991 | Totten | ........................ | 144/135.2 |
| 5,335,473 A * | 8/1994 | Chase | ........................ | 52/745.08 |
| 5,377,470 A * | 1/1995 | Hebinck | ........................ | 52/405.1 |
| 5,540,026 A * | 7/1996 | Gartland | ........................ | 52/455 |
| 5,647,174 A * | 7/1997 | Mattarelli | ........................ | 52/36.3 |
| 5,675,952 A * | 10/1997 | French | ........................ | 52/455 |
| 5,782,055 A * | 7/1998 | Crittenden | ................... | 52/784.1 |
| 5,852,910 A * | 12/1998 | Zebedee | ........................ | 52/784.1 |
| 5,860,260 A * | 1/1999 | Hase | ............................. | 52/307 |
| 5,894,701 A * | 4/1999 | Delorme | ................... | 52/801.11 |
| 6,141,938 A * | 11/2000 | Schiedegger | .............. | 52/745.19 |
| 6,185,894 B1 * | 2/2001 | Sisco et al. | ...................... | 52/457 |
| 6,190,782 B1 * | 2/2001 | French | ........................ | 428/542.2 |

(Continued)

*Primary Examiner* — Shelley Self
(74) *Attorney, Agent, or Firm* — Mark F. Smith; Smith Brandenburg Ltd.

(57) ABSTRACT

The present invention is a new and novel modular raised wall paneling system and method of manufacture that is economical, labor non-intensive, and can be easily constructed for a variety of room configurations and dimensions. The modular raised wall paneling system of the present invention comprises a plurality of individual panel sections having a joint there between, wherein a panel section includes a recess portion forming the appearance of a raised panel thereon. In a preferred embodiment of the invention the panel sections include along opposed longitudinal edges a tongue and a groove such that the panel sections can be disposed in parallel side-by-side mating relationship such that the tongue of one panel section is received in the groove of an adjacent panel section.

12 Claims, 16 Drawing Sheets

U.S. PATENT DOCUMENTS

| | | | |
|---|---|---|---|
| 6,341,461 B1 * | 1/2002 | Crowley et al. | 52/311.2 |
| 6,354,347 B1 * | 3/2002 | Brewer | 144/218 |
| 6,374,562 B1 * | 4/2002 | Crowly | 52/506.01 |
| 6,487,827 B2 * | 12/2002 | Hollman | 52/455 |
| 6,532,709 B2 * | 3/2003 | Pervan | 52/403.1 |
| 6,598,366 B2 * | 7/2003 | Hsieh et al. | 52/506.01 |
| 6,751,915 B2 * | 6/2004 | Crowley | 52/311.2 |
| 6,772,569 B2 * | 8/2004 | Bennett et al. | 52/592.1 |
| 7,185,469 B2 * | 3/2007 | Schaffeld | 52/586.1 |

* cited by examiner

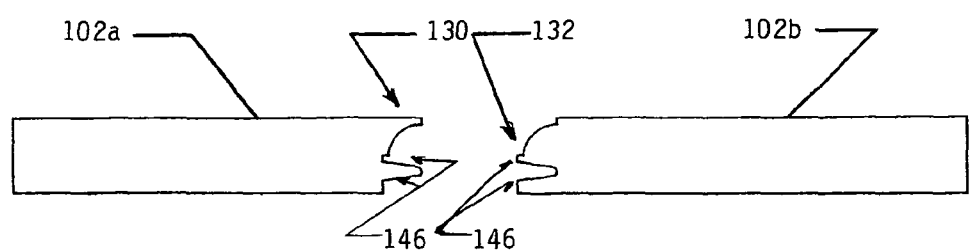
FIG. 5
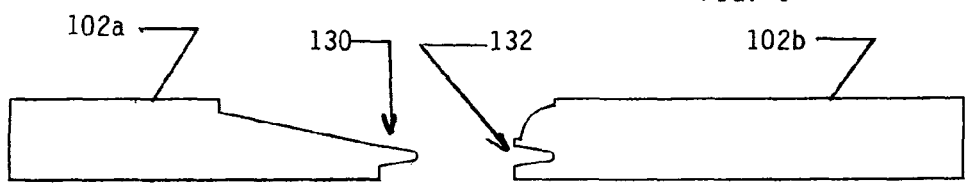
FIG. 6

FIG. 16
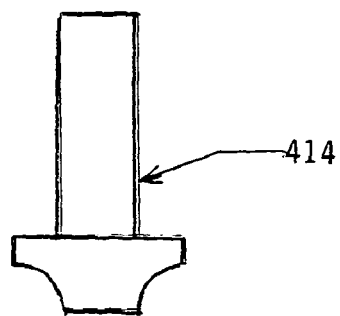
FIG. 17
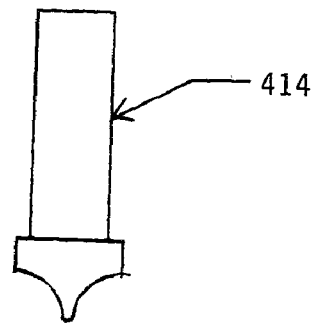

MODULAR RAISED WALL PANELING SYSTEM AND METHOD OF MANUFACTURE

RELATED PATENT APPLICATIONS

This application is a divisional application of U.S. Pat. No. 7,185,469, issued on Mar. 6, 2007, Ser. No. 10/389,497, filed on Mar. 14, 2003, entitled MODULAR RAISED WALL PANELING SYSTEM and has the same inventor in common.

BACKGROUND OF THE INVENTION

The present invention relates to a raised wall paneling system and more particularly, to a modular raised wall paneling system and method of manufacture that is economical, labor non-intensive, and can be easily constructed for a variety of room configurations and dimensions.

Conventionally, raised panel walls are often used for internal rooms of dwelling houses, office suites, and other similar arrangements, to enhance the appearance of a room. At one time, such walls were formed from solid wood sheets having raised panels that added to the aesthetic appeal of the wall. Unfortunately, the material cost of creating a solid wood wall is substantial and an extensive amount of labor is required to manufacture and install the wall. Accordingly, building contractors have looked for substituting conventional solid wood raised walls with more cost effective products.

As a substitute for conventional solid wood raised walls it has become common to form raised walls using preassembled raised paneling systems that are typically manufactured in panel sections formed from sheets of material such as particle board or medium density fiber board. Such panel sections can then be assembled together, usually at the location of installation, to form a wall having the appearance of a wall formed of solid wood. The raised panels and side portions of the wall are typically formed by cutting and assembling frame members into a raised panel member that is then secured to the panel section with nails, screws, or an equivalent mounting means. Such a method of manufacture, however, is still substantially expensive because it requires several precise machining and assembly operations. In addition, such raised panels also have a tendency to respond readily to the humidity and temperature conditions of the surrounding air by either contracting or expanding. This often results in causing panel separation thus reducing the overall aesthetic appeal of the paneled wall.

In recent years, installing a raised wall paneling system has also become popular for home improvement projects. Unfortunately, another problem associated with conventional preassembled raised wall paneling systems is that each system must be sized and cut to enable the individual panels to precisely fit along the wall on which it is to be installed. Further, such panels should fit together in such a manner as to minimize the formation of unsightly seams or joints between the individual panel sections. A raised wall paneling system must also be able to accommodate windows, doors and the like while providing an aesthetic appealing appearance. This requires a substantial amount of skilled carpentry labor to ensure the system's proper installation and fit. Accordingly, the installation requirements of conventional raised wall paneling systems are often beyond the ability of many individuals.

It is therefore apparent that there is a need for a raised wall paneling system that gives the appearance of solid wood paneling thereby enhancing the appearance of a room, that is relatively inexpensive, that can react to changes in climatic conditions without detracting from its aesthetic appearance, that can be easily sized to fit specific room geometry, and which is relatively easy to manufacture and install requiring a minimum amount of labor or required skill. A need also exist for a method of manufacturing and supplying a raised wall paneling system that is economical, produces a paneling system that precisely fits along the wall on which it is to be installed, minimizes unsightly seams, and can be easy installed with a minimum amount of labor and skill.

SUMMARY OF THE INVENTION

The present invention is a new and novel raised wall paneling system, and more specifically, the present invention is a new and novel modular raised wall paneling system and method of manufacture that is economical, labor non-intensive, and can be easily constructed for a variety of room configurations and dimensions. The modular raised wall paneling system of the present invention comprises a plurality of individual panel sections having a joint there between, wherein a panel section includes a recess portion creating the appearance of a raised panel. In a preferred embodiment of the invention the panel sections include along opposed longitudinal edges an interlocking means for interlocking the individual panel sections together. In a preferred embodiment of the invention, the interlocking means comprises a tongue and a groove, such that the panel sections can be disposed in parallel side-by-side mating relationship so that the tongue of one panel section is received in the groove of an adjacent panel section.

In another preferred embodiment of the invention the individual panel sections are secured together by an attaching means.

In another preferred embodiment of the invention the modular raised wall paneling system includes a horizontal rail and vertical stiles.

In another preferred embodiment of the invention the modular raised wall paneling system includes along opposed horizontal edges a second interlocking means for interlocking individual vertically aligned panel sections together. In a preferred embodiment of the invention, the second interlocking means comprises a tongue and a groove such that the panel sections can be disposed in parallel side-by-side mating relationship such that the tongue of one panel section is received in the groove of an adjacent panel section.

In another preferred embodiment of the invention the modular raised wall paneling system is formed from a group of materials consisting of pressed wood, particle board, medium density fiber board, plywood, laminated wood, and plastic.

In another preferred embodiment of the invention the modular raised wall paneling system includes instructions identifying the location of the individual panel sections in relation to each other.

In another preferred embodiment of the invention the modular raised wall paneling system includes a panel section having a milled recess portion.

In another preferred embodiment of the invention the modular raised wall paneling system is constructed by the method comprising the steps of measuring the room to be paneled, calculating the number and dimensions of panel sections for the modular raised wall system, and calculating the dimensions of each raised wall panel.

In another preferred embodiment of the invention the method of constructing the modular raised wall system includes the step of forming each raised wall panel by applying a milling process to the panel section.

In another preferred embodiment of the invention the method of constructing the modular raised wall system includes the step of forming a tongue and a groove along opposed lateral edges of each panel section.

In another preferred embodiment of the invention the method of constructing the modular raised wall system includes placing an order using the Internet and providing measurements of the room to be paneled.

In another preferred embodiment of the invention the method of constructing the modular raised wall system includes identifying each panel section and its relationship to the other panel sections forming the modular wall system.

These and other objects and advantages of the invention will be apparent from the following drawings and detailed description of the preferred embodiments.

BRIEF DESCRIPTION OF THE DRAWINGS

To provide a more complete understanding of the present invention and further features and advantages thereof, reference is now made to the following description taken in conjunction with the accompanying drawings, in which:

FIG. 5 is a top view taken along line 5-5 of FIG. 3 illustrating a preferred interlocking means of the raised wall paneling system comprising a tongue and a groove formed along opposed longitudinal edges that form an abutting joint between individual wall panels;

FIG. 6 is a sectional view taken along line 6-6 of FIG. 3 illustrating the tongue and groove opposed longitudinal edges forming an abutting joint between individual wall panels;

FIG. 16 is a schematic representation of a vertical spindle of the computer controlled milling machine of FIG. 12;

FIG. 17 is a schematic representation of a horizontal spindle of the computer controlled milling machine of FIG. 12;

DETAILED DESCRIPTION OF THE INVENTION

Figure 1:
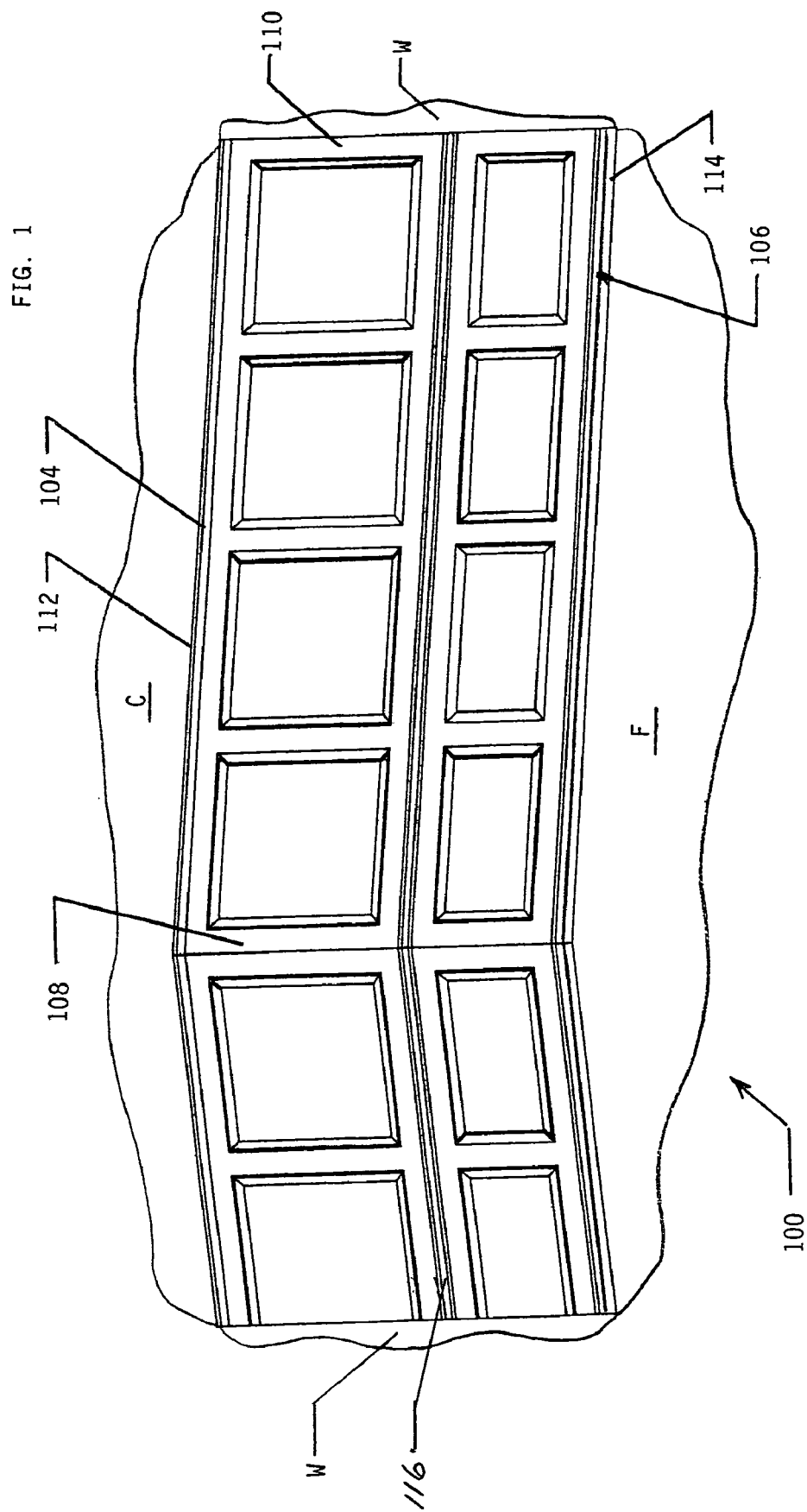
FIG. 1 is a partial perspective view of the modular raised wall paneling system of the present invention showing a plurality of individual panels mounted along a wall.

The present invention relates to a new and novel paneling system and more specifically to a modular raised wall paneling system and a method of manufacture. In describing the preferred embodiments of the invention, specific terminology will be resorted to for the sake of clarity. However, the invention is not intended to be limited to the specific terms so selected, and it is to be understood that each specific term includes all technical equivalents that operate in a similar manner to accomplish a similar purpose.

Referring to FIGS. 1 through 4, the modular raised wall paneling system 100 of the present invention is shown having a plurality of individual panel sections 102 mounted along one or more surfaces such as a wall W or a ceiling C. As shown, each panel section 102 preferably extends from the floor F to the ceiling C. In a preferred embodiment of the invention, the modular raised wall paneling system 100 further includes a top rail 104 and a base rail 106 installed horizontally across the upper 105 and lower 107 edges respectively of individual panel sections 102, and a first end stile 108 and a second end stile 110. Other accessories can be provided, such as a decorative cap 112 and a shoe 114 installed horizontally across the upper and lower edges of the top rail 104 and the base rail 106 respectively, and a chair rail molding 116 that extends horizontally across the panel sections 102. Preferably, the medium used in the manufacture of the individual panel sections 102 is a fiberboard due to its dimensional stability. It should be understood, however, that other materials such as pressed wood, particle board, plywood, laminated wood, plastic, or any other suitable material may also be used. The panel sections 102 are partially finished with an acrylic coat of paint or in a wood veneer. The rails 104, 106 and 116 and accessories are typically formed from wood, plastic, particle board, or can be formed from some other conventional material suitable for use for wall moldings.

Figure 2:
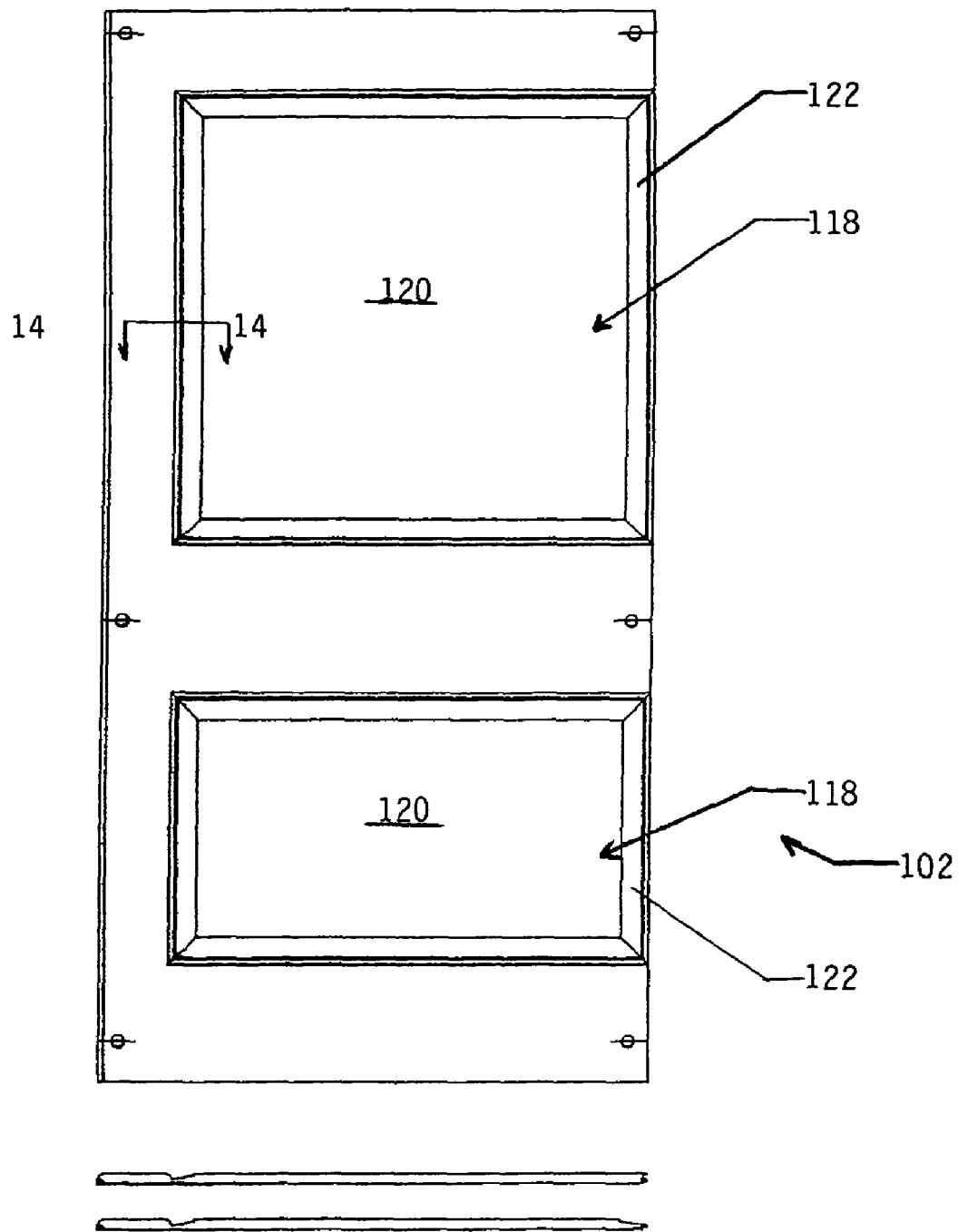
FIG. 2 is a front, top, and bottom views of a pair of individual panels forming the modular raised wall paneling system of FIG. 1.
Figure 3:
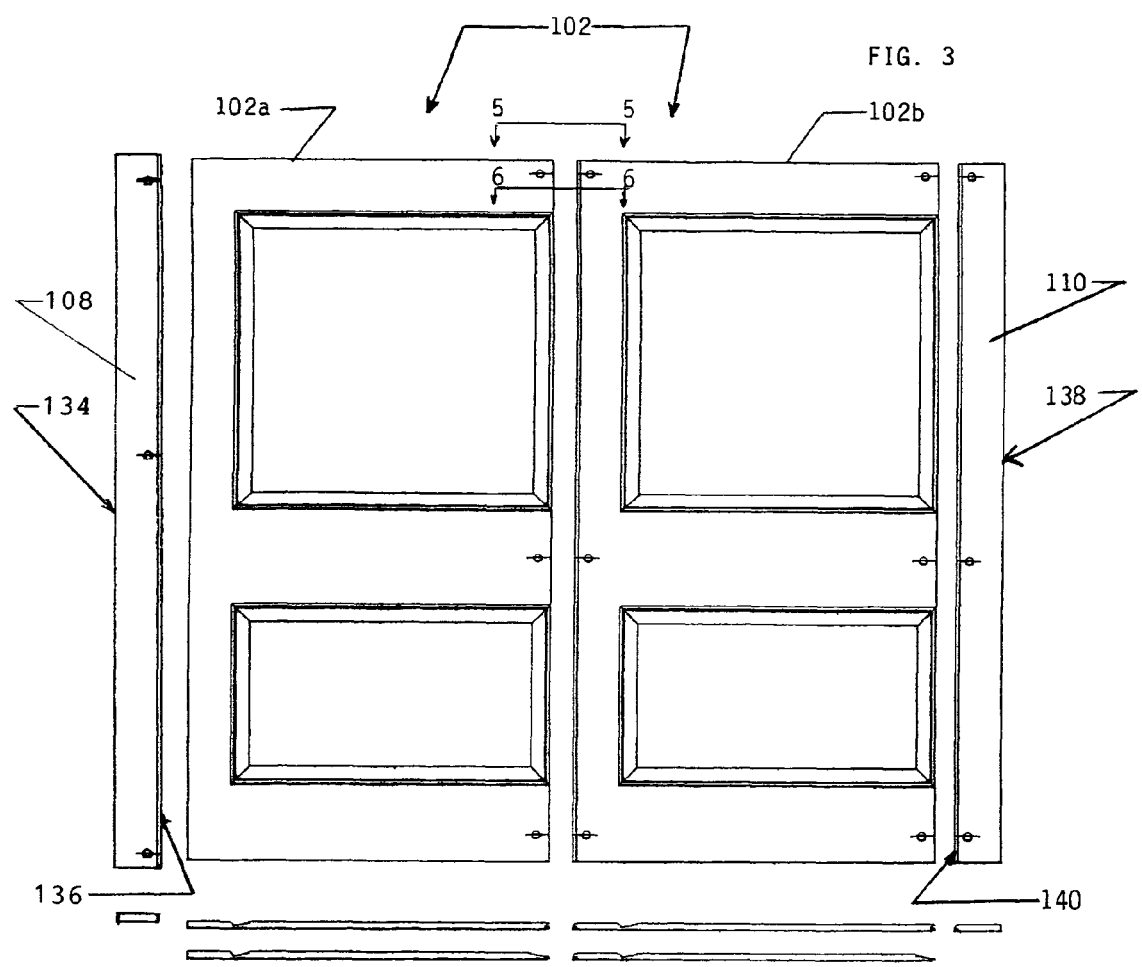
FIG. 3 is an exploded front, top, and bottom views of a pair of individual panels and a vertical end casing of the modular raised wall paneling system of FIG. 1.
Figure 14:
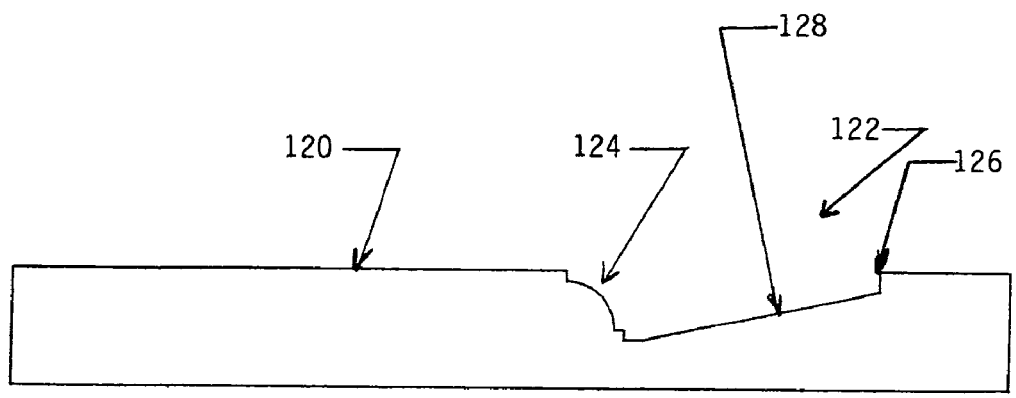
FIG. 14 is a side sectional view taken along section 14-14 of FIG. 2 showing the recessed periphery of a raised wall panel.
Figure 15:
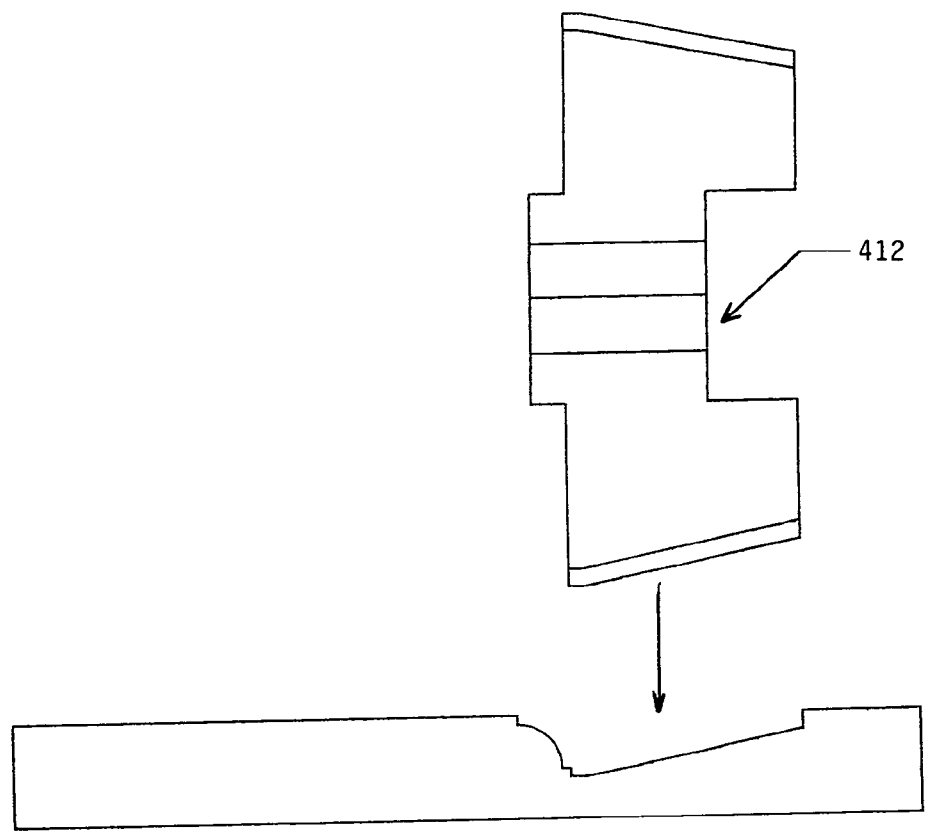
FIG. 15 is a schematic representation of a horizontal spindle of the computer controlled milling machine of FIG. 12.

As shown in FIGS. 2 and 14, each panel section 102 includes at least one raised wall panel 118 which preferably is generally rectangular in shape and comprises a planar face 120 and a recess periphery 122 having an inner step portion 124 and an outer step portion 126 and a planar portion 128 there between. Preferably, as shown, the planar portion 128 is sloped or beveled outwardly from the inner step portion 124 to the outer step portion 126 and together cooperate with the planar face 120 to give the appearance of a conventional solid wood raised wall panel. It should be understood that while the raised wall panel 118 is preferably rectangular in shape, other geometric shapes may also be utilized.

As illustrated in FIGS. 3 through 6, each individual panel section 102 includes along opposed vertically extending longitudinal edges an interlocking means 129. In a preferred embodiment of the invention, the interlocking means 129 comprises a tongue 130 and a groove 132 such that the individual panel sections 102 can be placed in parallel side-by-side relationship where the tongue 130 of one panel section 102a is received in and mated in the groove 132 of an adjacent panel section 102b. As shown, the first end stile 108 includes an outer butt end 134 for placing at the end or against a corner of the surface to be paneled and an inner groove end 136 that is adapted for mating with the tongue 130 of the first panel section 102. The second end stile 110 includes an outer butt end 138 for placing at the other opposite end of the surface to the paneled and an inner tongue end 140 that is adapted for mating with the groove of the last panel section 102. As shown, as assembled, the edges of tongue 130 of one panel section 102a is horizontally positioned such that when mated with the groove 132 of an adjacent panel section 102b the panel section 102b forms a vertical stile 142 that runs between the raised wall panels 118 and forms the outer seam 144 of a raised wall panel 118. In this way, seams 144 formed between any two mated panel sections and between the end stiles and the corresponding panel sections will run along the outer edge of the raised wall panels and are therefore partially hidden or camouflaged thereby minimizing the appearance of the seams 144. While the vertically extending longitudinal edges 145 are provided with an interlocking means 129, such as a tongue or groove, it should be understood that the horizontally extending longitudinal edges 105 and 107 may also be provided with a second interlocking means (not shown), such as a tongue and groove, to allow additional panel sections to be placed vertically side-by-side relationship for paneling larger surfaces such as a room with a high ceiling.

As illustrated in FIGS. 5 and 6, in a preferred embodiment of the invention, the tongue 130 and the groove 132 of each panel section 102 are beveled thereby making them more durable and less susceptible to damage during shipping and installation. It should also be understood that by beveling the edges 146 of the tongue 130 and the groove 132, results in a joint that is more rigid and stronger than a straight cut joint thereby reducing the necessity of having a wall stud to be positioned behind the joint. In addition, beveling the joint reduces the need to accurately align the tongue 130 with the groove 132 during installation thereby making assembly of the modular raised wall paneling system 100 significantly easier.

Figure 4:
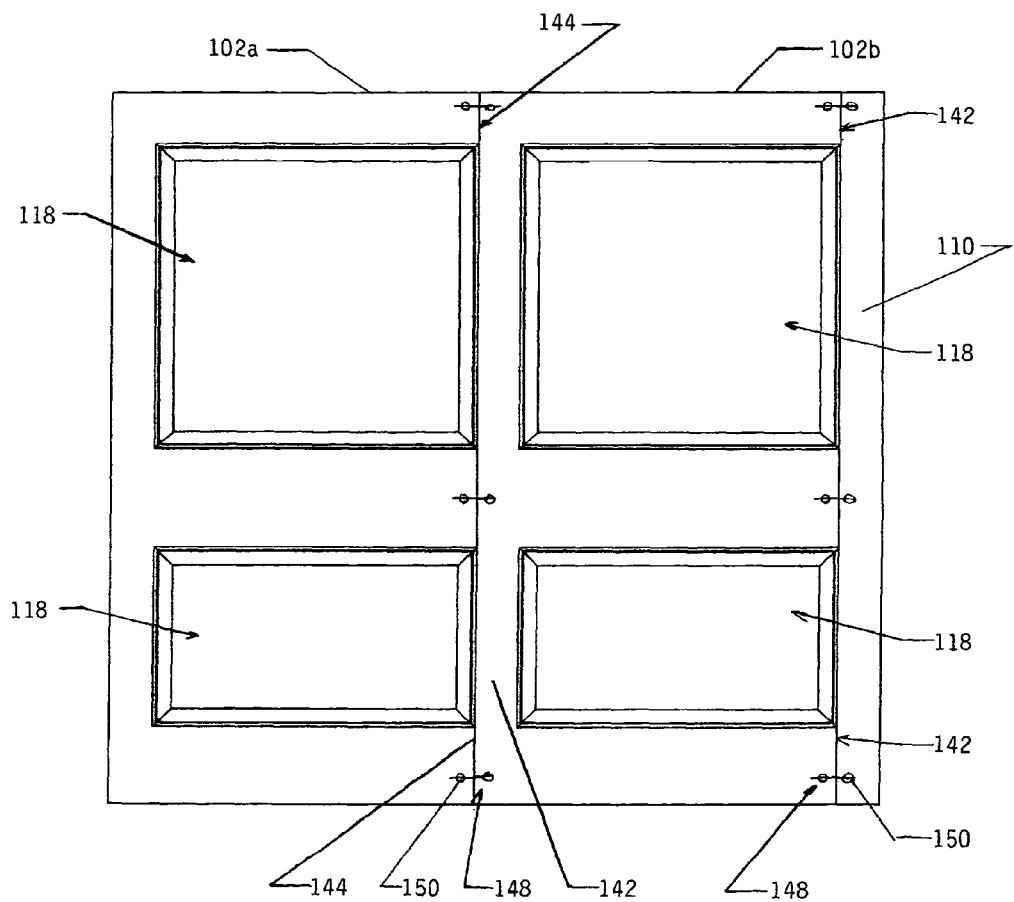
FIG. 4 is a front view of the pair of individual panels and the vertical end casing of FIG. 3 shown in an assembled condition.
Figure 7:
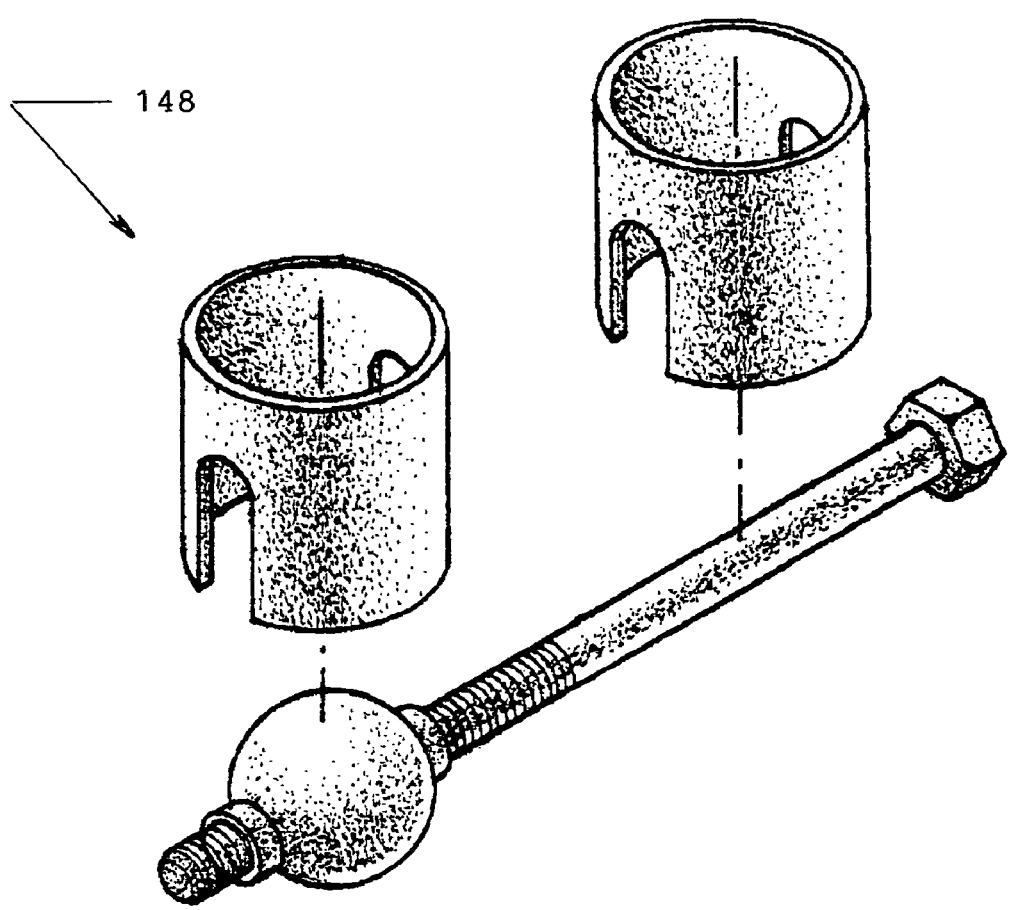
FIG. 7 is an enlarged view of the attachment means of the raised wall paneling system of FIG. 1 that is used for drawing, securing and holding the individual paneling sections together.
Figure 8:
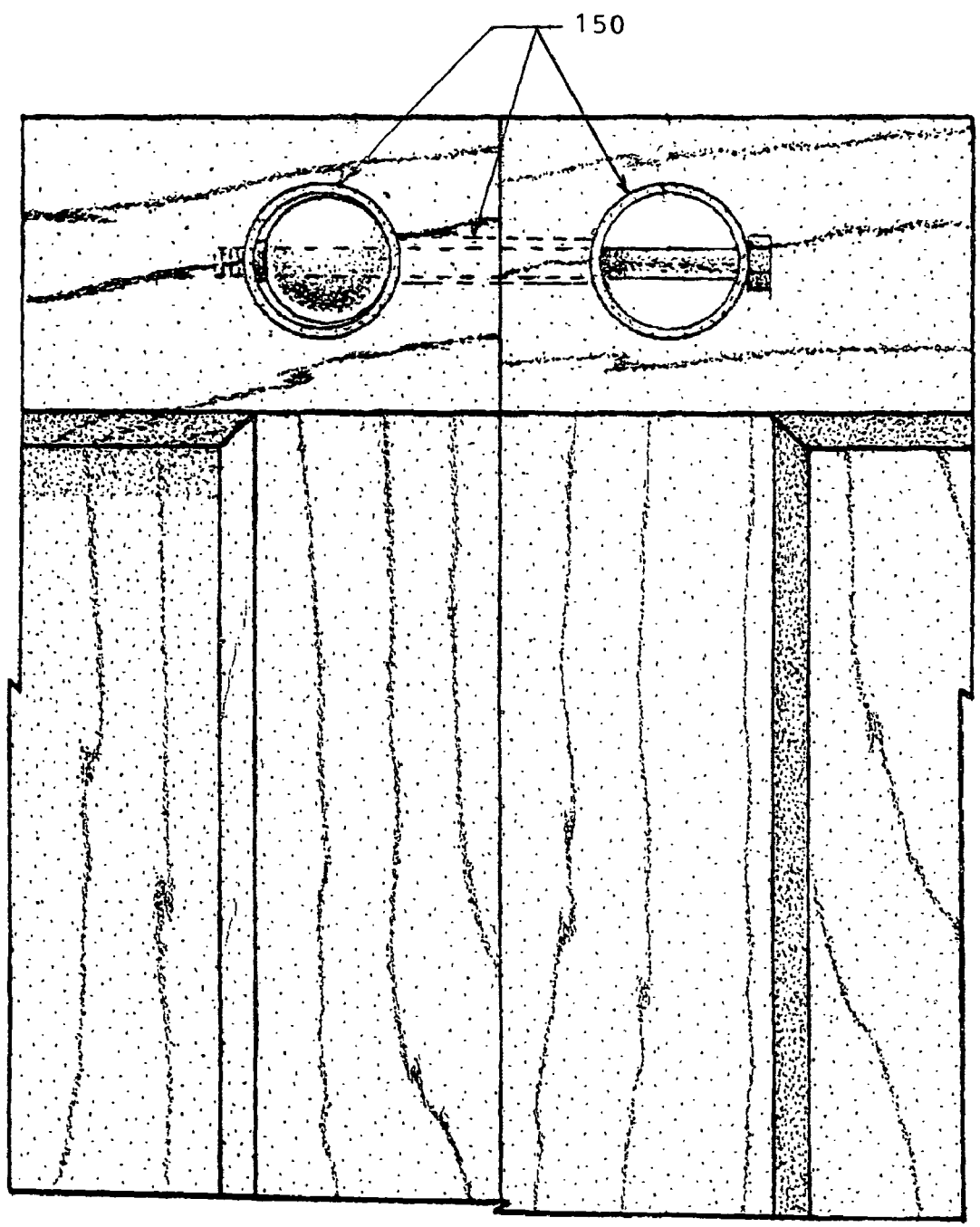
FIG. 8 is another enlarged view of the attachment means of FIG. 7 showing placement within a slot.

As illustrated in FIGS. 4, 7 and 8, in order to provide additional support, individual panel sections 102 are drawn and secured together by a plurality of attaching means 148. In a preferred embodiment of the invention, as illustrated, the attachment means 148 comprises a conventional joint fastener, such as a ball and screw fastener sold by Knape & Vogt as KV Deluxe Tite-Joint Fastener KV-516. As shown, the attachment means 148 is inserted within aligned slots 150 of adjacent panel sections 102 that are contoured for receiving the attachment means 148 such that when tightened the attachment means 148 operates to draw together, secure and hold the panel sections 102 together. It should be understood, that other types of attachment means may be utilized that can be inserted within slots contoured to receive the particular attachment means and which operate to draw together and secure the individual panel sections together. As shown in FIG. 1, the individual panel sections 102 can then be attached to a surface, such as a wall W or a ceiling C, by securing means (not shown) such as nails, screws, staples, glue, and the like. It should be understood that the securing means should be applied horizontally along the upper and lower edges of panel sections 102 where the rails are positioned such that the securing means can be hidden by the top rail 104, base rail 106, and chair rail 116, respectively. The rails 104, 106 and 116, as well as any decorative cap 112 and shoe 114 are preferably applied by glue. It should be understood, however, that other convention methods, such as the use of finishing nail or screws may also be used to attach the rails or other accessories to the panel sections 102.

Figure 9:
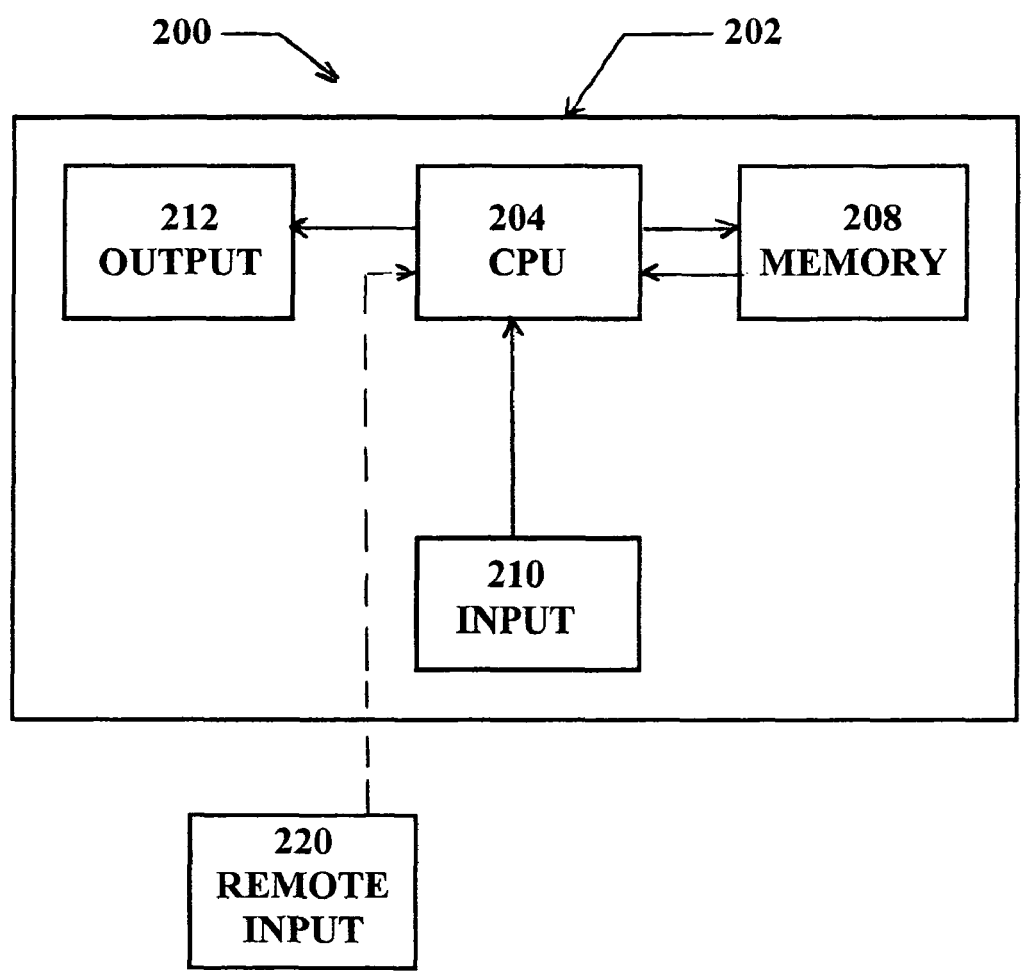
FIG. 9 is a schematic representation of an apparatus for designing the modular raised wall paneling system of the present invention.
Figure 10:
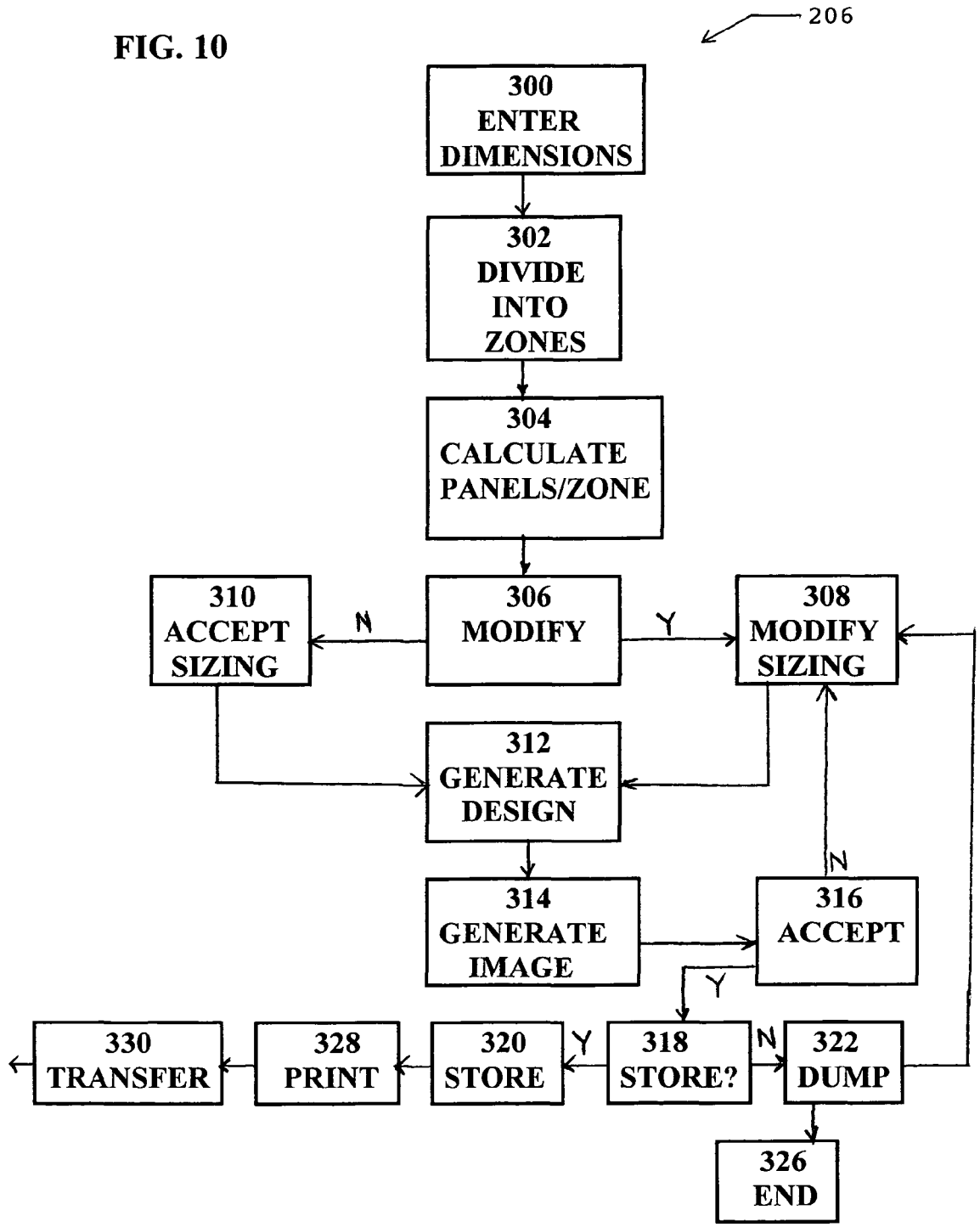
FIG. 10 is a flow diagram of a preferred embodiment of the apparatus for performing the method of designing a modular paneling system of the present invention having a computer system for implementing the system software incorporated therein.
Figure 11:
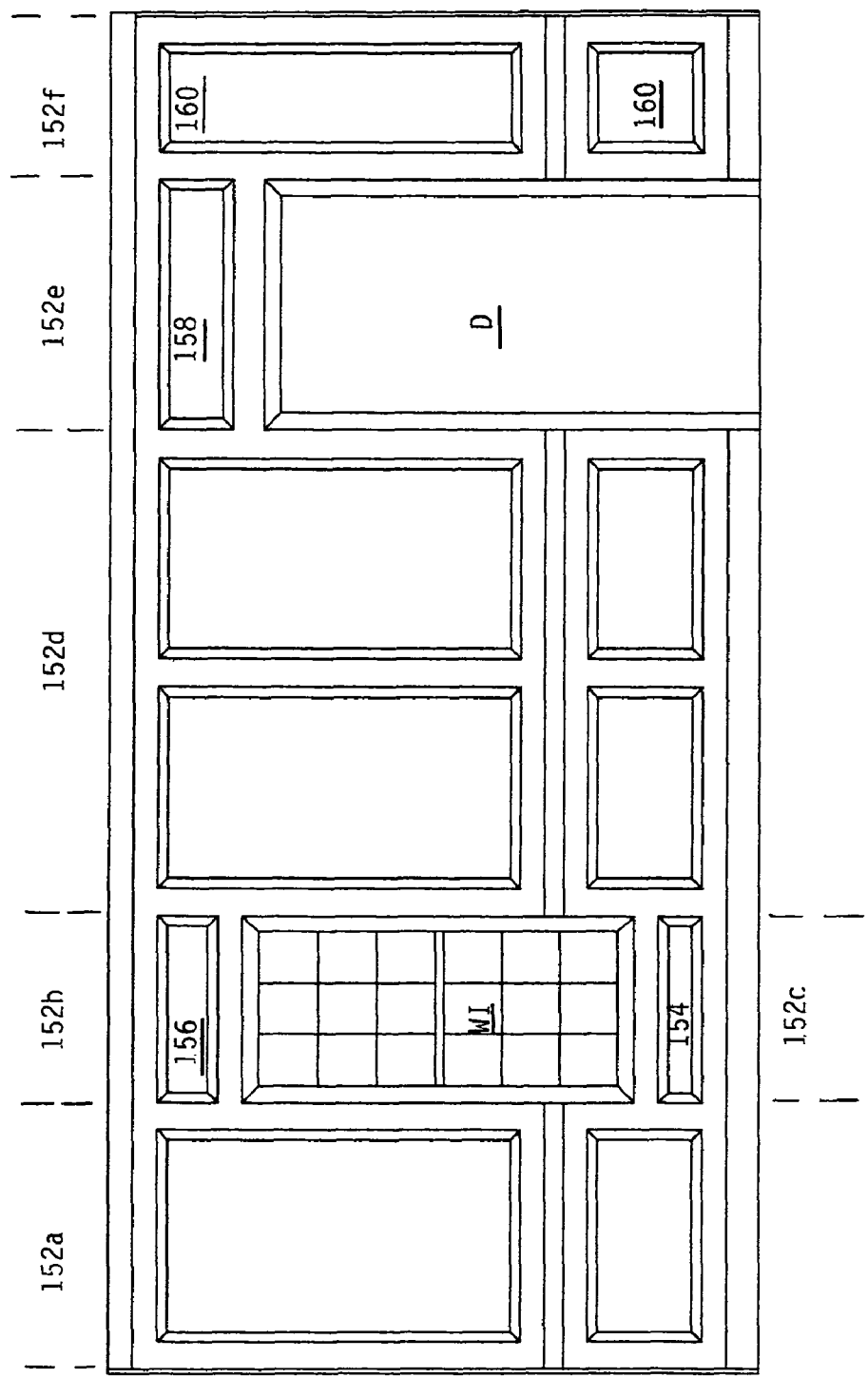
FIG. 11 is a schematic representation showing the zoning for use in designing the modular raised wall paneling system of the present invention.
Figure 12:
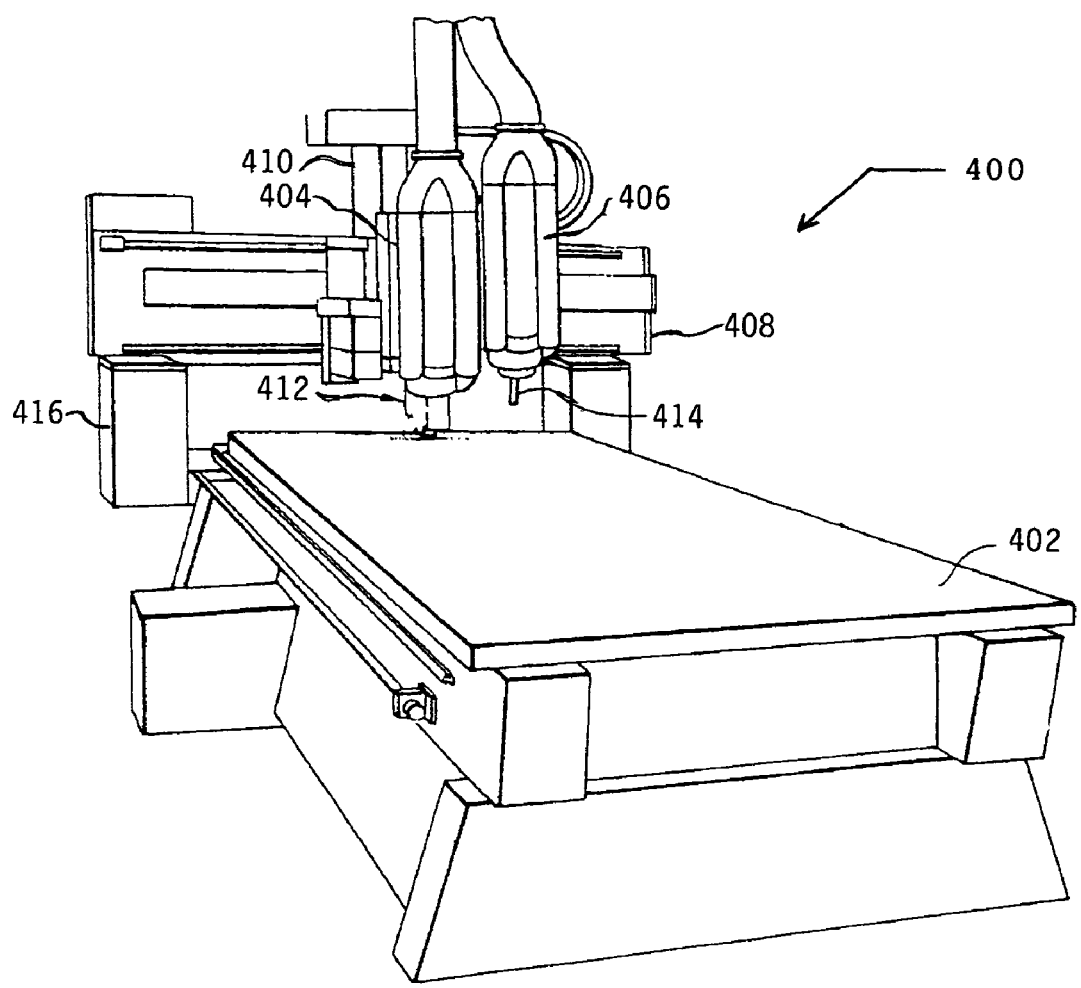
FIG. 12 is a perspective view of a computer controlled milling machine for performing the method of manufacturing the modular paneling system of the present invention.
Figure 13:
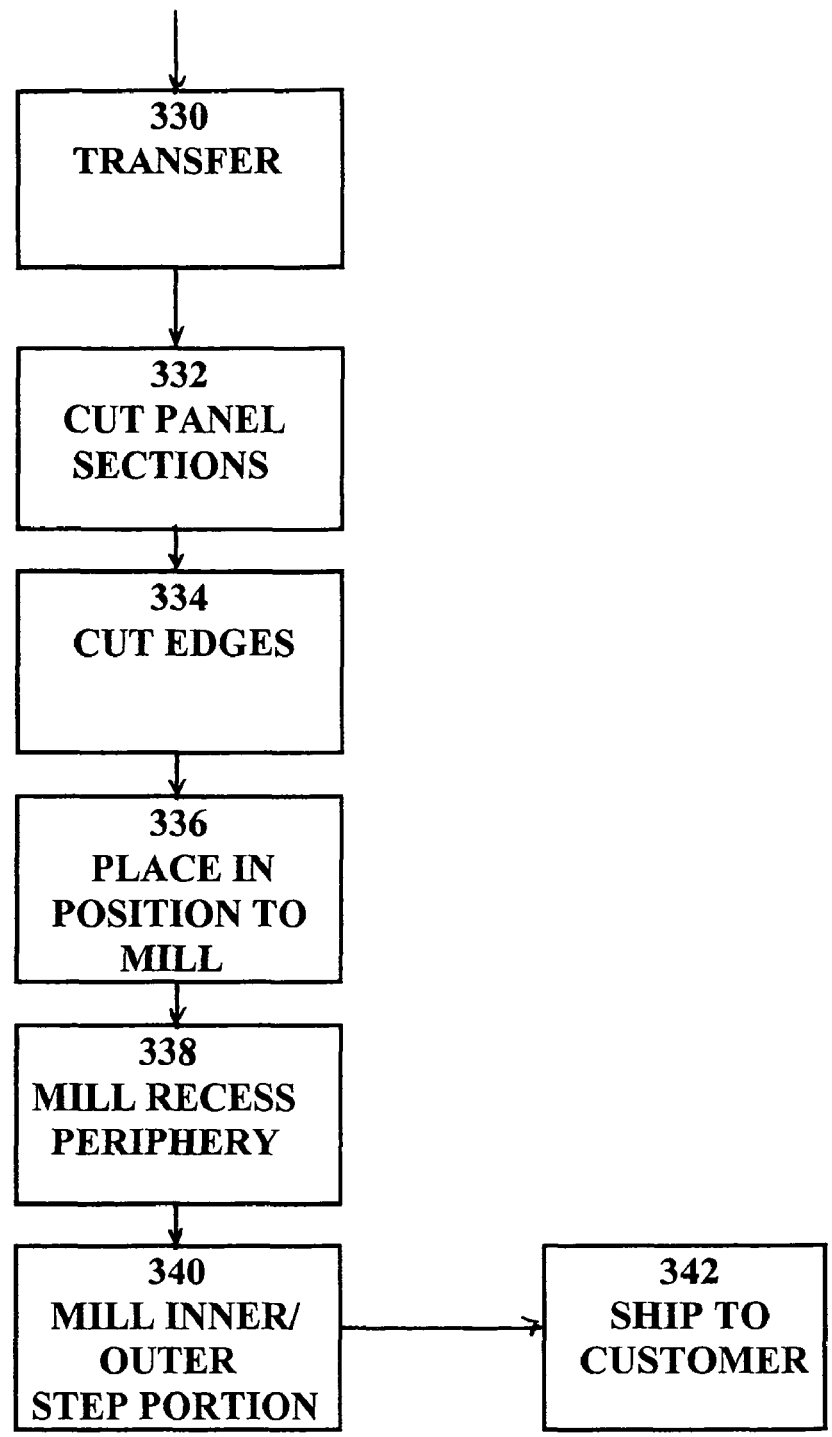
FIG. 13 is a continuation of the flow diagram of FIG. 10.

Referring to FIGS. 1, 9 and 10, a preferred embodiment of the apparatus 200 for manufacturing the modular raised wall paneling system 100 of the present invention is shown and comprises a visualization and modification device (VMSPD) 202 having a central processing unit 204 used to implement the system software 206 of the VMSPD 202. The central processing unit 204 includes a memory 208 and may be electronically coupled to other devices, such as a suitable input device 210, like a keypad, touch screen, mouse, cursor, voice recognition unit, or any other suitable input device that can accept information, and one or more suitable output devices 212, such as a computer or electronic display device, printer, projection device, and the like. It should be understood that the VMSPD 202 can include any combination of the above components, or any number of different components, peripherals, and other devices. Preferably, the central processing unit 204 operates under the control of an operating system, such as the WINDOWS™ operating system developed by Microsoft Corporation or the Macintosh™ operating system developed by Apple Computer Corporation. It should be understood, however, that other operating systems could be utilized to implement the system software 206 of the VMSPD 202 of the present invention.

The system software 206 is a user or a computer-readable medium having user or computer-readable instructions for performing the method of manufacturing the raised wall paneling system 100 of the present invention. Preferably, the system software 206 is an interactive, menu and event driven system that uses prompt, dialog, and entry windows to guide a user to enter information. As used herein, the term "software" refers to any form of programmed machine-readable language or instructions (e.g., object code) that, when loaded or otherwise installed, provides operating instructions to a machine capable of reading those instructions, such as a computer. The system software 206 of the present invention can be stored or reside on, as well as be loaded or installed from, one or more floppy disks, CD ROM disks, hard disks or any other form of suitable non-volatile electronic storage media. The system software 206 can also be installed by downloading or other form of remote transmission, such as by using Local or Wide Area Network (LAN or WAN)-based, Internet-based, web-based or other remote downloading or transmission methods.

Referring to FIG. 10 a flowchart illustrating the structured methodology and design of the system software 206 used for implementing the method of the present invention is shown. Referring also to FIGS. 1, 2, 9 and 11, upon entering the system software 206 (step 300), the system software 206 operates by directing the operator to enter the dimensions, preferably using the metric system, of the surface(s) to be paneled including the location and size of all door, window, and other openings (or surfaces to be paneled around) and jamb sizes of the wall or walls to be paneled by using the input device 210 of the VMSPD 202. The system software 206 then operates (step 302) to break the surface(s) to be paneled into one or more zones, identified herein in this example as 152a, 152b, 152c, 152d, 152e and 152f. Each zone is determined by the size of the raised wall panel 118 to be used on the individual panel section 102. For example, in order to maintain the architectural integrity of the modular raised wall paneling system 100 and the overall appearance of the room, the preferred size of raised wall panels 154 and 156 positioned below and above a window WI, respectively, or a raised wall panel 158 above a door D, or raised wall panels 160 formed along a smaller section of the wall W may be smaller than the raised wall panels positioned along the remaining wall. Accordingly, in this example six zones would be identified, one zone 152a would be created covering the area to one side of the window WI, one zone 152b covering the area above the window WI, one zone 152c covering the area below the window WI, one zone 152d covering the area between the window WI and the door D, one zone 152e covering the area above the door D, and one zone 152f covering the area along between the door D and the edge of the wall W. The system software 206 then operates to calculate the number of equal sized panel sections for each zone (step 304). If two zones perpendicularly intersect, such as when two walls intersect, the system software 206 operates to subtract the thickness of the medium being used from the dimension from one of the intersecting panel sections to ensure that the appearance of the stile at the intersection will be consistent with all of the other stiles thereby maintaining the architectural integrity of the finished installed paneling system.

In a preferred embodiment of the invention, only the individual raised wall panels will vary in size while the widths of the rails and stiles will remain constant. Preferably, the number of wall panel sections is calculated based on the minimum number of wall panel sections required and the width of the medium. For example, standard sizes for panel medium is typically four-foot (4' or 1.22 m) or five-foot (5' or 1.52 m) in width and eight-feet (8' or 2.44 m) or ten-feet (10' or 3.05 m) in height. For a medium having a thickness of 0.75 inches (1.91 cm) and for a wall having a length of fourteen feet (14' or 4.27 m) could be covered using four standard four-foot medium panels each being 3.5 feet (1.07 m) long or three standard five-foot medium panels each being 4.67 feet (1.42 m) long.

After the system software 206 has calculated the number of equal sized panel sections for each zone, the system software 206 then directs the operator (step 306) to either modify the selected zones and panel sizing (step 308) using the input device 210 or to accept the selected zones and panel sizing (step 310). If the sizing of the modular raised wall paneling system is to be modified or the desired individual panel sizes are to be modified, the modifications can be made to the sizing using conventional computer aided design methods or in the form of sizing modifications by inputting measurement information or from using previously supplied sizing information stored in the memory 208. The system software 206 then operates to generate a new paneling system design (step 312). In a preferred embodiment of the invention, an image (not shown) is produced (step 314) showing the modular raised wall paneling system and displayed on the output device 212. The operator can then accept the modified sizing (step 316) using the input device 210 or can make additional modifications.

After the operator has accepted the sizing and the appearance of the raised wall paneling system to be installed, the system software 206 directs (step 318) the operator to store the sizing information in the memory 208 of the VMSPD 202 or in a separate paneling storage bank, such as on one or more floppy disks, CD ROM disks, hard disks or any other form of suitable non-volatile electronic storage media (step 320), or to dump the sizing information (step 322). If the operator decides to dump the sizing information, the system software 206 directs the operator to either end the program (step 326) or to input new surface dimensions (step 308) and begin the process over. If the operator decides to store the sizing information, a final design can be stored and printed (step 328) using the output device 212 or another output device, such as a conventional printing device, at a remote location.

As shown in FIGS. 9, 11, 12 and 13, after the final design of the raised wall paneling system has been selected, the operator can then direct the system software 206 to transfer the information to a conventional numerically controlled cutting machine 400 (step 330). The cutting machine 400 of the present invention is shown comprising a stationary surface 402; a first tool head 404 and a second tool head 406 mounted to a control slide 408 for horizontally moving the tool heads 404 and 406 with respect to the stationary surface 402; a tool head support 410 for vertically moving the tool heads 404 and 406 with respect to the stationary surface 402; a horizontal spindle 412 mounted to the tool head 404; and a vertical spindle 414 mounted to the tool head 406, and a numerical controller 416 for controlling the movements of the control slide 408 and the tool head support 410 to control the position of the spindles 412 and 414. One such numerically controlled cutting machine is manufactured and sold by the Thermwood Corporation of Dale, Ind. After the numerically controlled cutting machine 400 has been provided with instructions from the central processing unit 204, the individual panel sections are cut into their proper dimensions (step 332). The edges of the cut panel sections are then cut (step 334) with an interlocking means, as previously described, such that the individual panel sections when assembled can be secured together as previously described herein, and the slots for receiving the attachment means, as previously described, are formed.

Figure 18:
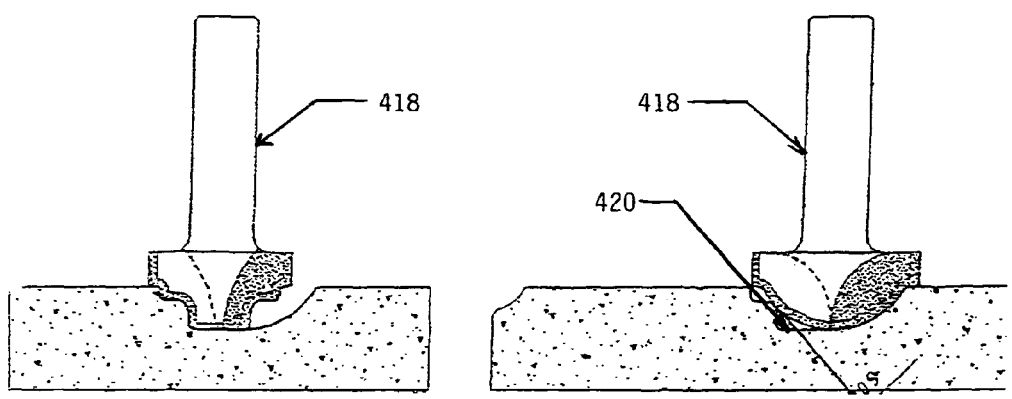
FIG. 18 is a side view of a section of the beveled portion of a raised wall panel being formed using prior art tooling.
Figure 19:
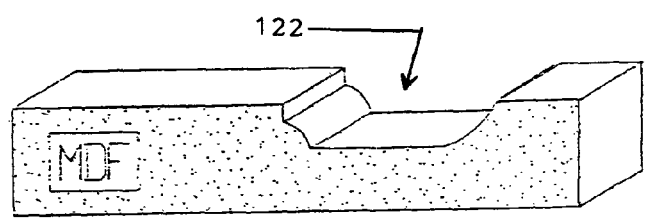
FIG. 19 is a perspective view of the beveled portion of a raised wall panel formed from the prior art tooling of FIG. 18.

After the edges of a panel section 102 have been cut with the interlocking means, the panel section 102 is placed in position to be milled (step 336). As shown in FIGS. 2, 12 through 17, depending on the particular stage of operation, the spindle used can be a horizontal spindle 412 (FIG. 15) or one of several vertical spindles 414 (FIGS. 16 and 17). As illustrated, the individual panel sections 102 are first milled (step 338) using the horizontal spindle 412 that operates to mill out the beveled portion 128 of the recess periphery 122 of each raised wall panel 118. As shown in FIGS. 18 and 19, a recess periphery 122 cut area produced by a vertical spindle 418 will result in forming a relatively horizontal space 420 along the recess periphery 122. Such spacing 420 is often undesirable and will often detract from the overall appearance of the raised wall paneling system 100. It has been found that the use of a horizontal spindle will significantly reduce or eliminate the horizontal space 420 thereby enhancing the overall appearance of the assembled modular raised wall paneling system 100. The inner step portion 124 and the outer step portion 126 of the raised wall panel 118 are then milled using a vertical spindle 414 (step 340). In order to reduce the rounding of the corners, a series of vertical spindles, such as shown in FIGS. 16 and 17, having sequentially reduced cutting diameters are used in overlapping cutting relationship to minimize the rounding of the corners and give the raised wall panel 118 the appearance of having square corners (step 342). The finished panel sections 102, together with assembly instructions (not shown) and all previously described attachment means and accessories, can then be shipped to the customer location (step 342) for assembly and installation.

In another preferred embodiment of the invention, the method of manufacturing a raised wall paneling system further comprising the step of selecting the particular paneling system to be manufactured and storing the sizing information in the memory 208 of the VMSPD 202 which can be done from a remote location 220 (FIG. 9) such as by the customer using an Internet based input system.

It should now be understood that the raised wall paneling system and the method of manufacture of the present invention permits manufactures to allow for flexibility and customization. For example, a typical fourteen-foot (4.27 m) wall could be laid out with four panels having a width of 3½ feet each. The system software of the present invention, however, allows the operator to design a paneling system having five panels; one panel of four feet, two panels of three feet each, and two panels of two feet each.

It should also be understood that customers can also input room dimensions, such as by means of the Internet. Based on the room or wall measurements and location of all doors, windows, and the like, a paneling system can be manufactured as described herein above. The modular raised wall paneling system is then sent to the customer. The customer, using the instructions that identify each panel section and their relationship to one and another can easily constructed the modular raised wall paneling system. It should now be apparent to those skilled in the art that the present invention provides a modular raised wall paneling system that is relatively easy to manufacture and install and requires a minimum amount of labor or required skill.

It should also be understood that unlike manufacturing processes that use only vertical spindles where the cut on one side of the vortex is also cut on the other side, the use of a horizontal spindle in the manufacture of the modular raised wall paneling system of the present invention allows the use of different spindles to create a substantial number of panel peripheries having various profiles.

Accordingly the modular raised wall paneling system and the method of manufacture of the present invention provides an apparatus and a method of manufacture that easily and economically provides a modular raised wall paneling system that has the appearance of a conventional solid wood systems, that enhances the appearance of a surface, such as a wall or ceiling, that is relatively inexpensive, that can react to changes in climatic conditions without detracting from its aesthetic appearance, that can be easily sized to fit specific room geometry, and which is relatively easy to manufacture and install requiring a minimum amount of labor or required skill. It should also now be apparent that the method of manufacturing and supplying the modular raised wall paneling system of the present invention is economical, produces a paneling system that precisely fits along the surface on which it is to be installed, minimizes unsightly seams, and can be easy installed with a minimum amount of labor and skill.

While the method and apparatus described constitute preferred embodiments of the invention, it is to be understood that the invention is not limited to the precise method and apparatus, and that changes may be made therein without departing from the scope of the invention which is defined in the appended claims.

What is claimed is:

1. A method of manufacturing a modular raised wall paneling system to be installed onto a surface, the method comprising the steps of:
   determining the dimensions of the surface to be paneled;
   dividing the surface into one or more zones;
   determining the number and dimensions of each panel section for each zone;
   cutting a plurality of panel sections, wherein each panel section is cut to the proper dimensions and wherein at least two of said panel sections have different dimensions; and
   milling each panel section to form a raised wall panel such that at least one panel section having a planar face and a recess periphery including an inner step portion, an outer step portion and a beveled section there between.

2. The method of claim 1 wherein said milling includes using a horizontal spindle to cut the beveled section and a vertical spindle to cut the inner and the outer step portions.

3. The method of claim 1 further comprising the steps of forming along opposed lateral edges of each panel section a tongue and a groove such that the tongue of one panel section is adapted for mating with the groove of another panel section.

4. The method of claim 1 wherein each tongue and groove are formed to have beveled edges.

5. The method of claim 1 further comprising the step of placing an order and providing measurements of the surface to be paneled using the Internet.

6. The method of claim 1 further comprises the step of identifying each panel section and how each panel section will be positioned with respect to the other panel sections forming the modular wall system and providing instructions to the customer for assembling the modular wall system wherein the instructions identify each panel section and how each panel section should be positioned with respect to the other panel sections.

7. A method of manufacturing a raised wall paneling system comprising the steps of:
   forming at least two panel sections each having desired dimensions;
   forming an interlocking means along at least one edge of each panel section;
   using a horizontal spindle to shape a beveled portion of a recess periphery in each panel section; and
   using at least one vertical spindle to shape an inner step portion and an outer step portion on each panel section to form a raised wall panel.

8. The method of claim 7 further comprising the step of using additional vertical spindles in overlapping cutting relationship to minimize the rounding of the corners of each panel section.

9. The method of claim 7 wherein one said interlocking means comprises a tongue and another said interlocking means comprises a groove such that the panel sections can be disposed in parallel side-by-side mating relationship with one another such that said tongue of one interlocking means of one said panel section is received in said groove of said interlocking means of the other said panel section.

10. The method of claim 7 further comprising the step of storing the desired dimensions of the panel section into an electronic memory of a central processing unit and using a numerically controlled cutting machine effective for receiving instructions from the central processing unit for cutting the panel section into the desired dimensions and for operating the horizontal spindle and vertical spindle.

11. The method of claim 7 further comprising the step of forming slots within the panel section that are adapted for receiving an attachment means.

12. The method of claim 7 wherein the panel medium is cut using a numerically controlled cutting machine and wherein the desired dimensions are determined and transmitted by use of the Internet for inputting into a central processing unit that controls the operation of the numerically controlled cutting machine.

* * * * *